Aug. 19, 1941.   D. H. REEVES   2,253,397
ICE BREAKING TOOL
Filed Sept. 17, 1940   2 Sheets-Sheet 2
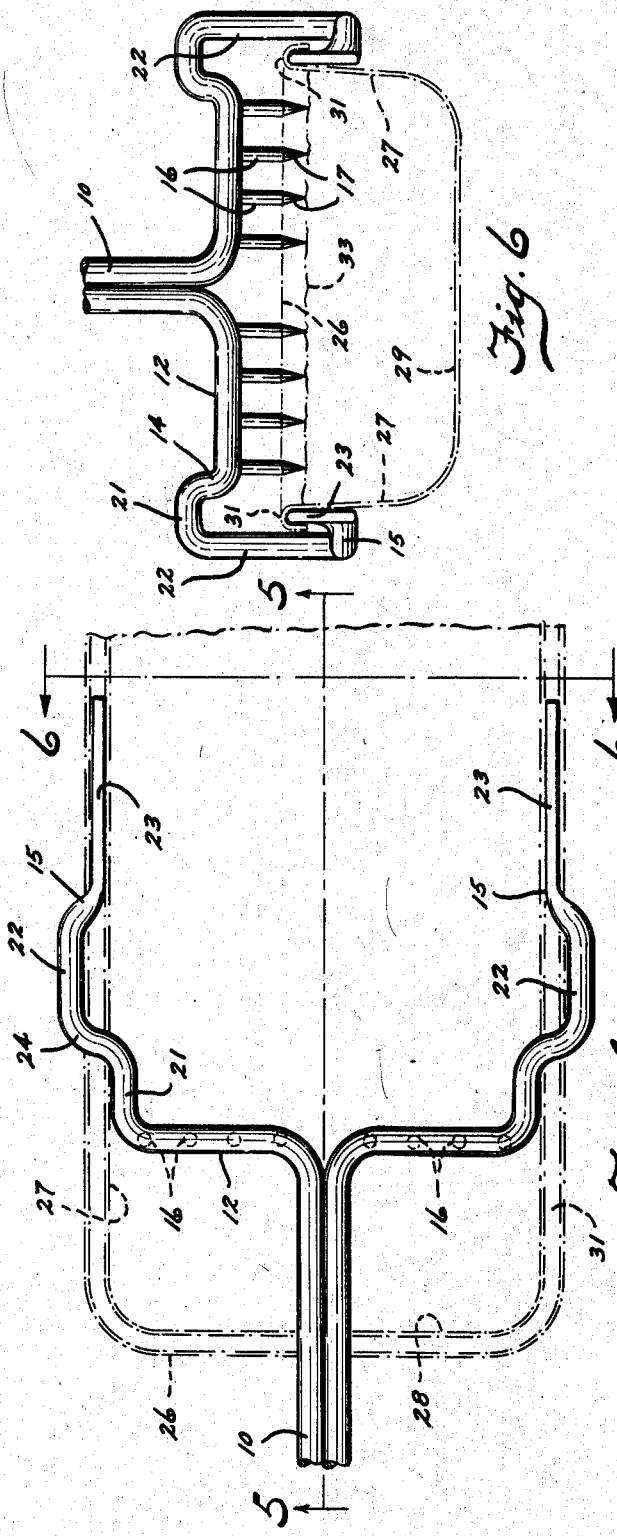
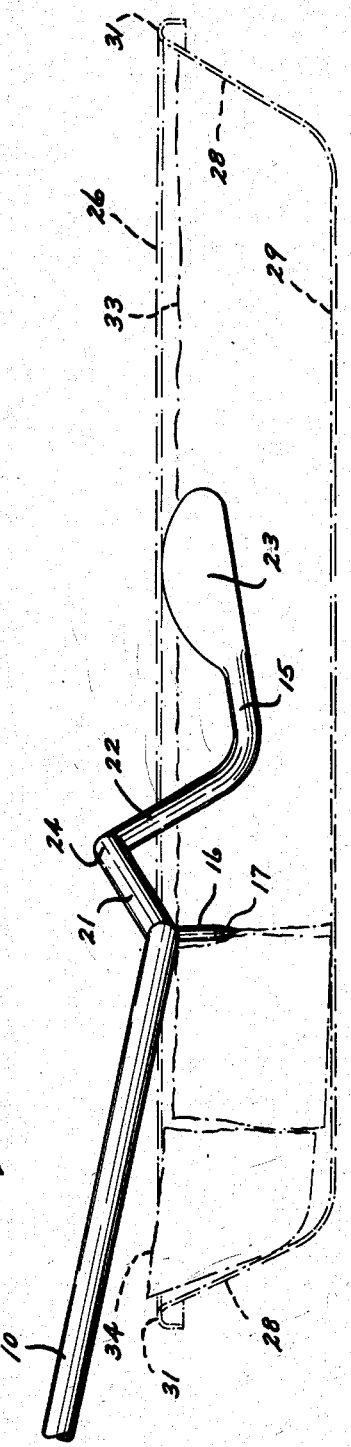
INVENTOR.
DONALD H. REEVES.
BY
Spencer, Hardman and Fehr.
HIS ATTORNEYS.

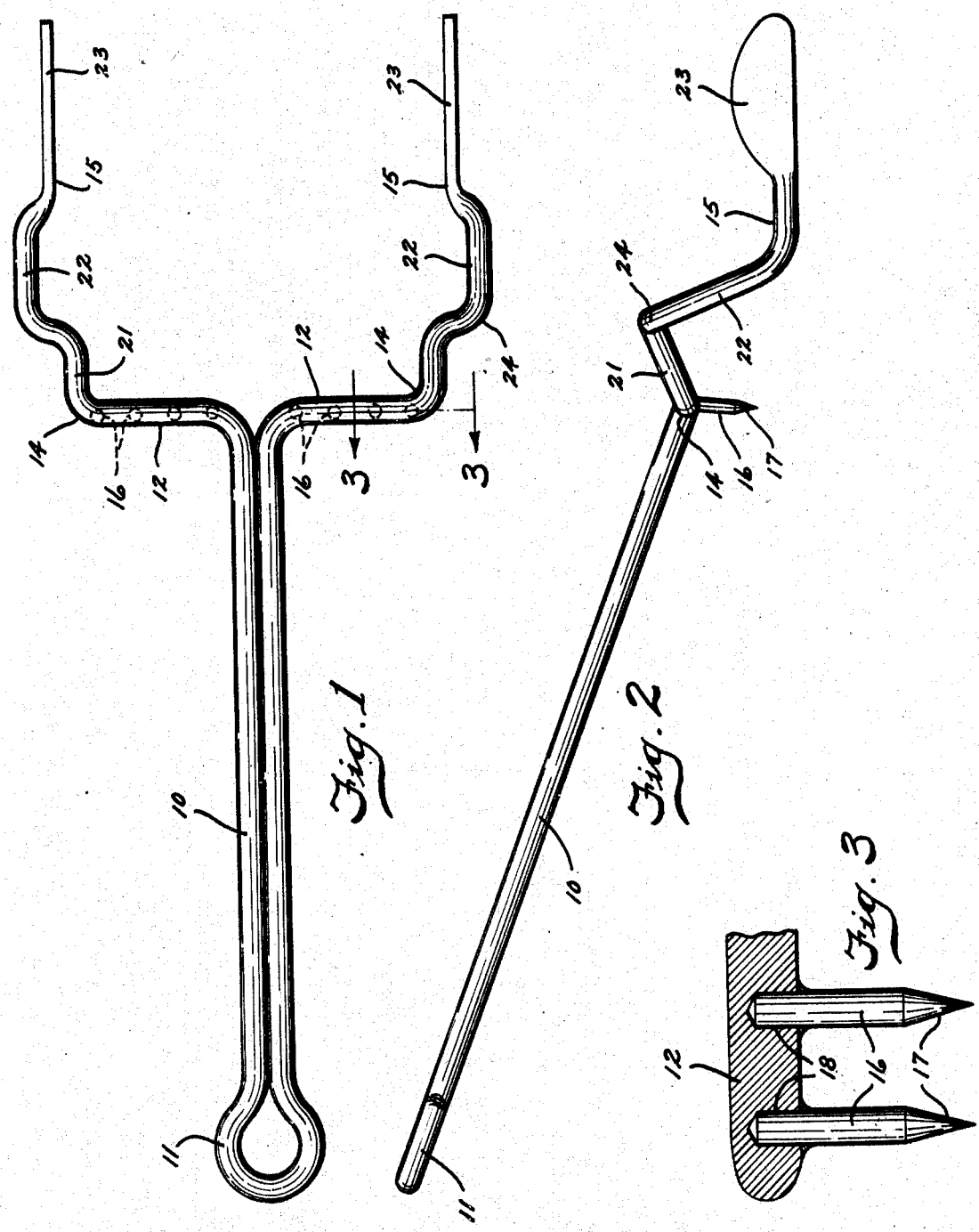

Patented Aug. 19, 1941

2,253,397

UNITED STATES PATENT OFFICE 2,253,397

ICE BREAKING TOOL

Donald H. Reeves, Dayton, Ohio, assignor to General Motors Corporation, Dayton, Ohio, a corporation of Delaware Application September 17, 1940, Serial No. 357,154

5 Claims. (Cl. 125—23)

This invention relates to a freezing device and particularly to a tool for releasing ice blocks from a tray of ice.

An object of my invention is to eliminate a grid structure from an ice tray and to provide means for releasing and harvesting ice blocks from a cake or body of ice frozen in a tray.

In carrying out the foregoing object, it is a further object of my invention to provide a fork-like device adapted to be detachably applied to an ice tray in a manner to form therewith a lever movable along the length thereof and manually actuatable to cut or break ice blocks in successive and independent operations from a body of ice contained in a tray.

A still further and more specific object of my invention is to provide such a fork-like device or tool of substantially one piece rod or bar stock preformed into a predetermined shape as to obtain the leverage desired of the tool when applied to a tray for the purpose described.

Further objects and advantages of the present invention will be apparent from the following description, reference being had to the accompanying drawings, wherein a preferred form of the present invention is clearly shown.

In the drawings:

Fig. 1 is a top view of a fork-like device constructed in accordance with the present invention;

Fig. 2 is a side view of the fork-like device shown in Fig. 1;

Fig. 3 is an enlarged sectional view of a portion of the device taken on the line 3—3 of Fig. 1 showing a plurality of prongs carried thereby;

Fig. 4 is a view similar to Fig. 1 showing the application of the device to an ice tray;

Fig. 5 is a view taken on the line 5—5 of Fig. 4 illustrating the application of the device to an ice tray and showing the device moved to break ice blocks from a body of ice in the tray; and Fig. 6 is a view taken on the line 6—6 of Fig. 4 illustrating the ice breaking prongs in contact with ice in an ice tray.

Referring to the drawings, and particularly to Figs. 1, 2 and 3, I show a rigid or substantially inflexible fork-like device formed of a length of stainless steel stock of approximately one-quarter inch in diameter. The round steel rod may be bent in any suitable or desirable manner and preferably by a bending or forming machine to provide the structural design of the fork-like device as hereinafter described. The rigid device includes a handle 10 formed of two abutting longitudinal portions of the rod looped or bent around as at 11. The end of handle 10 opposite the looped end 11 thereof has laterally extending parts 12, bent as at 14, and terminating in spaced apart tines 15 extending in the same general direction as the extension of handle 10. A plurality of metal prongs 16, of round cross sectional contour, are pointed and sharpened as at 17 and are disposed in openings 18 provided in the laterally directed parts 12 of the device (see Fig. 3). These prongs 16 depend from the parts 12 in spaced apart relation to one another and may be tightly pressed into the openings 18 and thereafter soft soldered to the stainless steel rod stock. A portion 21 of each tine 15 is bent upwardly out of the plane of extension of handle 10 or is bent upwardly at an angle relative thereto and a second or intermediate portion 22 of each tine 15 extends downwardly at an angle relative to the disposition of the portion 21 thereof. The end portion 23 of each tube 15 extends at an angle to the extension of portion 22 thereof and is flattened to dispose same perpendicularly with respect to the longitudinal extension of handle 10. End portion 23 of tines 15 has a curved upper surface (see Fig. 2) providing the forked device with a cam-like pivot portion adapted for a purpose to be presently described. The intermediate portion 22 of each tine 15 is bent laterally as at 24 (see Fig. 1) to dispose this portion of the tines a greater distance apart than the vertically disposed flattened end portions 23 thereof for a purpose to be hereinafter described.

The fork-like device herein disclosed is particularly adapted to be applied to a relatively shallow pan, such for example, as a metal tray containing a body of ice for cutting or breaking the ice, along a line transversely of the tray, into a plurality of small blocks of ice for harvest from the tray. Such trays are now commonly employed in household refrigerators, wherein ice is adapted to be produced for table use. Therefore, in Fig. 4 of the drawings, I show the fork-like device applied to an ice tray 26 which tray includes side walls 27, end walls 28 and a bottom wall 29. The top portion of the tray side and end walls is bent or rolled over to form a rim 31 extending entirely around the top of the tray 26. Tray 26 has been removed from an evaporator of a household refrigerating apparatus and contains a body of ice 33, frozen therein by the refrigerating effect produced by the evaporator. In order to cut or break the body of ice 33 into a plurality of small elongated blocks, I place the fork-like device of the present invention over one end of tray 26. The lateral spacing apart of the intermediate portions 22 of tines 15 of the fork device, provides a clearance for the rim 31 of tray 26 and permits the device to straddle the rim 31 of the tray as shown in Fig. 6, with the ends 23 of the tines positioned beneath the rim 31 and abutting the under side of the tray rim. With the device applied to the tray as shown, the pointed ends 17 of the prongs 16 rest upon the upper surface of the body of ice 33 in the tray. In Fig. 4 I show the fork-like device in a first position relative to the tray to be manipulated to break a block of ice from the end portion of the body thereof in the tray. Upon forcing the handle 10 of the fork-like device downwardly, prongs 16 enter the body of ice 33 and cut into the ice to break a relatively small elongated block 34 (see Fig. 5) from the body thereof. During the downward movement of the fork device, the cam-like upper surface of the ends 23 of tines 15 bear or pivot against the under side of rim 31 of the tray 26 to permit the downward force exerted upon handle 10 to be transmitted to the body of ice 33 through or by way of the prongs 16. The clearance afforded by the widely spaced apart intermediate portion 22 of tines 15 is utilized to permit the portion 12 of the fork-like device to be lowered into the interior of the tray to thereby cause the energy applied to handle 10 to force the prongs 16 downwardly into the body of ice to cut and/or break a block 34 therefrom. Portion 22 of each tine 15 is of a predetermined length so as to engage the rim 31 of tray 26, after the ice block 34 has been broken from the body of ice 33, and this prevents the ends 17 of prongs 16 from engaging and damaging the bottom wall 29 of the tray. The fork-like device is adapted to be moved along the length of tray 26 with the ends 23 of tines 15 under the rim 31, for successive independent spaced apart downward operations thereof to progressively break any number of ice blocks 34 of any desired size, in at least one direction of cross section therethrough, from the body of ice, such for example, as illustrated in Fig. 5 of the drawings.

Having described the construction of my device and its application to an ice tray together with the function thereof, it will be apparent that I have provided an improved and novel tool for harvesting blocks of ice from a body thereof, contained in a tray. My device is substantially of one piece construction and of low manufacturing cost. By my invention I have eliminated the necessity of using a complicated and expensive grid structure within an ice tray, while at the same time insuring the harvest of small ice blocks from a tray with a minimum of effort and a minimum of chipping or shattering of the ice. There are usually from four to eight trays in an evaporator of a household refrigerating apparatus, each tray being provided with a grid structure, and since only one of the devices of the present disclosure is supplied with each refrigerator cabinet and employed to remove ice blocks from all the trays thereof, it is obvious that I have greatly reduced the cost of household refrigerators.

While the form of embodiment of the invention as herein disclosed, constitutes a preferred form, it is to be understood that other forms might be adopted, all coming within the scope of the claims which follow.

What is claimed is as follows:

1. A rigid fork-like device formed of a metal rod bent to provide a handle having parts directed laterally from one end thereof and a tine extending from each of said parts in spaced apart relation to one another, said parts of said device having a plurality of prongs extending downwardly therefrom, and a portion of said tines intermediate their ends and said laterally directed parts of said device being laterally spaced apart a greater distance than the ends thereof.

2. A rigid fork-like device formed of a metal rod bent to provide a handle having parts directed laterally from one end thereof and a tine extending from each of said parts in spaced apart relation to one another, said parts of said device having a plurality of prongs extending downwardly therefrom, a portion of said tines intermediate their ends being disposed at an angle to the plane of extension of said handle, and said intermediate portion of said tines being laterally spaced apart a greater distance than the ends of said tines.

3. A rigid fork-like device comprising a handle having integral parts directed laterally from one end thereof and an integral tine extending from each of said parts in spaced apart relation to one another, said parts of said device having a plurality of prongs extending downwardly therefrom, each of said tines including a first portion extending upwardly from said laterally directed parts of said device and disposed at an angle to the plane of extension of said handle, each of said tines also including an intermediate portion depending from said first portion thereof and disposed at an angle thereto, said tines including an end portion extending from said intermediate portion thereof and disposed at an angle thereto, and said intermediate portion of said tines being laterally spaced apart a greater distance than the end portions thereof.

4. A rigid fork-like device formed of a stainless steel rod bent to provide a handle having parts directed laterally from one end thereof and a tine extending from each of said parts in spaced apart relation to one another, said parts of said device having a plurality of prongs extending downwardly therefrom, each of said tines including a first portion extending upwardly from said laterally directed parts of said device and disposed at an angle to the plane of extension of said handle, each of said tines also including an intermediate portion depending from said first portion thereof and disposed at an angle thereto, said tines including an end portion extending from said intermediate portion thereof and dispose at an angle thereto, said tine end portions being flattened in a direction perpendicularly to the extension of said handle, and said intermediate portion of said tines being laterally spaced apart a greater distance than the end portions thereof.

5. A rigid fork-like device provided with a handle having integral parts directed laterally from one end thereof and a tine formed integral with and extending from each of said parts in spaced apart relation to one another, said laterally directed parts of said device having a plurality of prongs extending therefrom, and a portion of said tines intermediate their ends and said laterally directed parts of said device being laterally spaced apart a greater distance than the ends thereof.

DONALD H. REEVES.